(12) United States Patent
Pu

(10) Patent No.: US 8,607,430 B1
(45) Date of Patent: Dec. 17, 2013

(54) METHOD FOR PROVIDING REMOVABLE GPS DEVICE IN REAR-VIEW CAR MIRROR

(75) Inventor: Kent Qing Pu, San Diego, CA (US)

(73) Assignee: InfoGation Corporation, San Diego, CA (US)

( * ) Notice: Subject to any disclaimer, the term of this patent is extended or adjusted under 35 U.S.C. 154(b) by 241 days.

(21) Appl. No.: 13/196,275

(22) Filed: Aug. 2, 2011

Related U.S. Application Data

(63) Continuation of application No. 12/344,515, filed on Dec. 27, 2008, now Pat. No. 7,991,528.

(51) Int. Cl.
*G01C 21/26* (2006.01)
*B21D 39/00* (2006.01)

(52) U.S. Cl.
USPC ................. 29/428; 701/36; 701/439

(58) Field of Classification Search
USPC ................. 701/36, 49, 211, 213, 439; 29/428
See application file for complete search history.

(56) References Cited

U.S. PATENT DOCUMENTS

| | | | |
|---|---|---|---|
| 2003/0117728 A1* | 6/2003 | Hutzel et al. | 359/838 |
| 2006/0050018 A1* | 3/2006 | Hutzel et al. | 345/60 |
| 2006/0164230 A1* | 7/2006 | DeWind et al. | 340/461 |

FOREIGN PATENT DOCUMENTS

| | | | |
|---|---|---|---|
| CN | 200964079 | * | 10/2007 |
| GB | 2318277 A | * | 4/1998 |

\* cited by examiner

*Primary Examiner* — Jermie Cozart
(74) *Attorney, Agent, or Firm* — Wuxi SinoIP Agency, Ltd.; Joe Zheng

(57) ABSTRACT

An interior rear-view mirror for cars is so designed that a portable GPS device may be readily mounted on. Depending on implementation, a portable GPS device may be slid in or clipped onto a rear-view mirror.

5 Claims, 5 Drawing Sheets

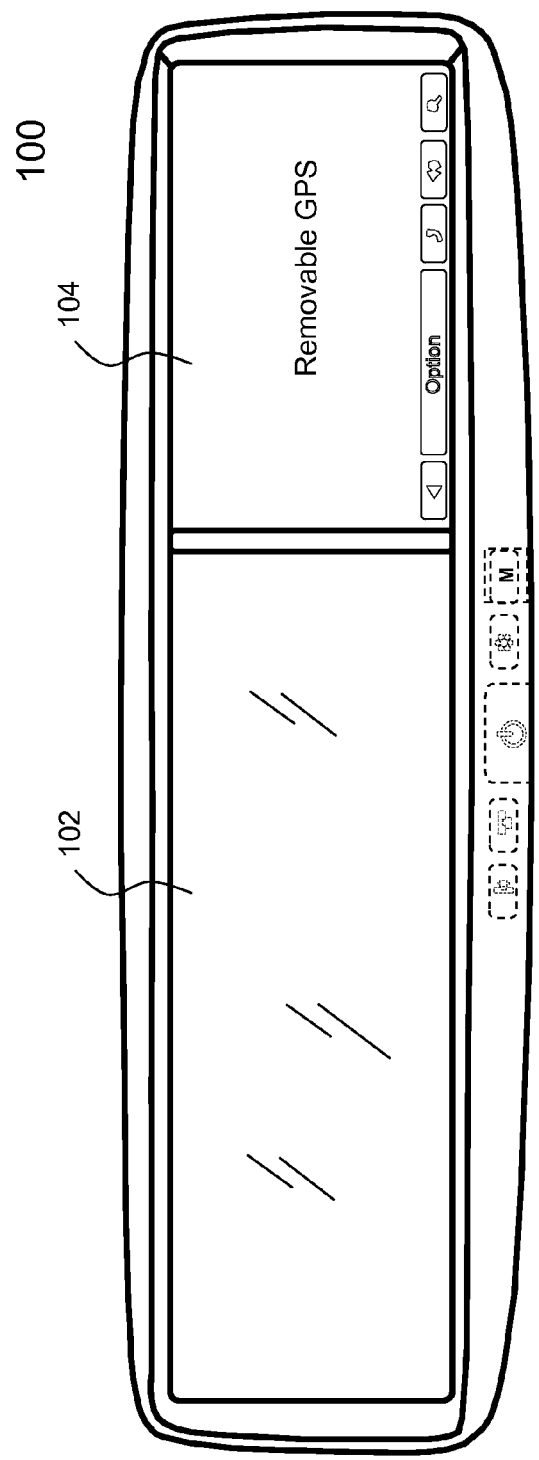

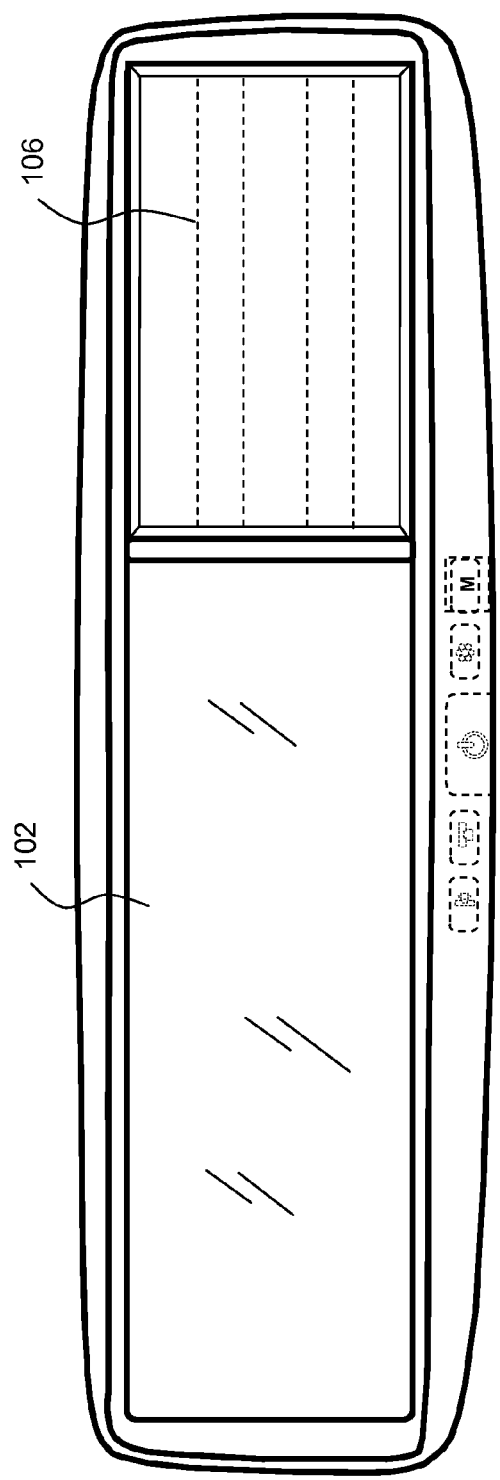

METHOD FOR PROVIDING REMOVABLE GPS DEVICE IN REAR-VIEW CAR MIRROR

CROSS REFERENCE TO RELATED APPLICATIONS

This is a continuation of U.S. application Ser. No. 12/344,515, entitled "Rear-view car mirror for accommodating a GPS device", filed on Dec. 27, 2008, which is now U.S. Pat. No. 7,991,528.

BACKGROUND OF THE INVENTION

1. Field of the Invention

The invention is generally related to the area of automotive parts. In particular, the invention is related to an interior rear-view mirror for accommodating a GPS device. The present invention is also related to method and apparatus for personalized voice for direction instructions.

2. The Background of Related Art

The Global Positioning System (GPS) is a Global Navigation Satellite System (GNSS) developed by the United States Department of Defense. It is the only fully functional GNSS in the world. It uses a constellation of between 24 and 32 Medium Earth Orbit satellites that transmit precise microwave signals, which enable GPS receivers to determine their current location, the time, and their velocity.

GPS devices have been used in many applications, noticeably in automobiles. Without reading detailed driving instruction on the road, a driver can get to a destination with a GPS device. Most of the GPS devices used in automobiles are installed on a dashboard but often a cause of vandalism to the vehicles. Portable GPS devices are popular. Many post-sale markets provide a mounting rack deposed on top of a dashboard to accommodate a portable GPS device. However, such a portable GPS device sitting on the rack on top of the dashboard sometimes obstructs the view of the driver.

In addition, many GPS devices provide machine generated or prerecorded voice for instruction. Not only does it sound boring but also it is likely to be ignored if a driver listens to the same voice with the same tone over and over again.

The present invention discloses a rear-view mirror that is designed to accommodate a GPS device that can be removed whenever there is a need. Meanwhile the present invention also discloses a GPS that is designed to receive personalized voice or generate personalized voice in accordance with inputs from a user.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to an interior rear-view mirror that is designed to accommodate a GPS device. The GPS device is portable and may be taken away with a user. According to one aspect of the present invention, the interior rear-view mirror is so designed that a portable GPS device may be readily mounted on. Depending on implementation, a portable GPS device may be slid in or clipped onto a rear-view mirror. As a result, the view of a driver is not likely to be obstructed and, at the same time, by taking away the GPS from a vehicle, the chance of having vandalism against the vehicle is reduced.

According to another aspect of the present invention, a GPS device is configured to allow a driver to enter personalized texts or record voices that are to be accessed as direction instructions. Thus personalized instruction is pronounced when there is a need to alert a driver.

The present invention may be implemented in many forms including software, hardware or a combination of both. According to one embodiment, the present invention is an interior rear-view mirror that comprises: a reflecting surface primarily used to assist a driver of a vehicle to view back of the vehicle; and a mounting mechanism arranged adjacent horizontally to the reflecting surface, the mounting mechanism designed to hold up a GPS device, wherein the GPS device is removable from the mounting mechanism.

According to another embodiment, the present invention is an interior rear-view mirror comprising: a reflecting surface primarily used to assist a driver of a vehicle to view back of the vehicle, wherein the reflecting surface includes a first part and a second part; and a mounting mechanism covered by the second part and exposed when the second part is removed, the mounting mechanism is arranged adjacent horizontally to the first part, the mounting mechanism designed to hold up a GPS device, wherein the GPS device is removable from the mounting mechanism.

According to another embodiment, the present invention is a GPS device comprising: a display screen to display a sequence of events; an input interface to receive a text for each of the events; and a microprocessor executing code to perform operations of: registering the text for the each of the events; and generating a verbal instruction from the text for the each of the events. The GPS device further comprises a speaker configured to play back the verbal instruction when the each of the events happens.

According to yet another embodiment, the present invention is a GPS device comprising: a display screen to display a sequence of events; a microphone to receive a voice for each of the events; a microprocessor configured to register the voice for the each of the events; and a speaker configured to play back the voice when the each of the events happens.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1A shows an exemplary interior rear-view mirror including a GPS device that can be used in a vehicle;

FIG. 1C shows the exemplary interior rear-view mirror of FIG. 1A with the GPS device removed (exposing a compartment for the GPS device);

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of data processing devices. These descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1B:
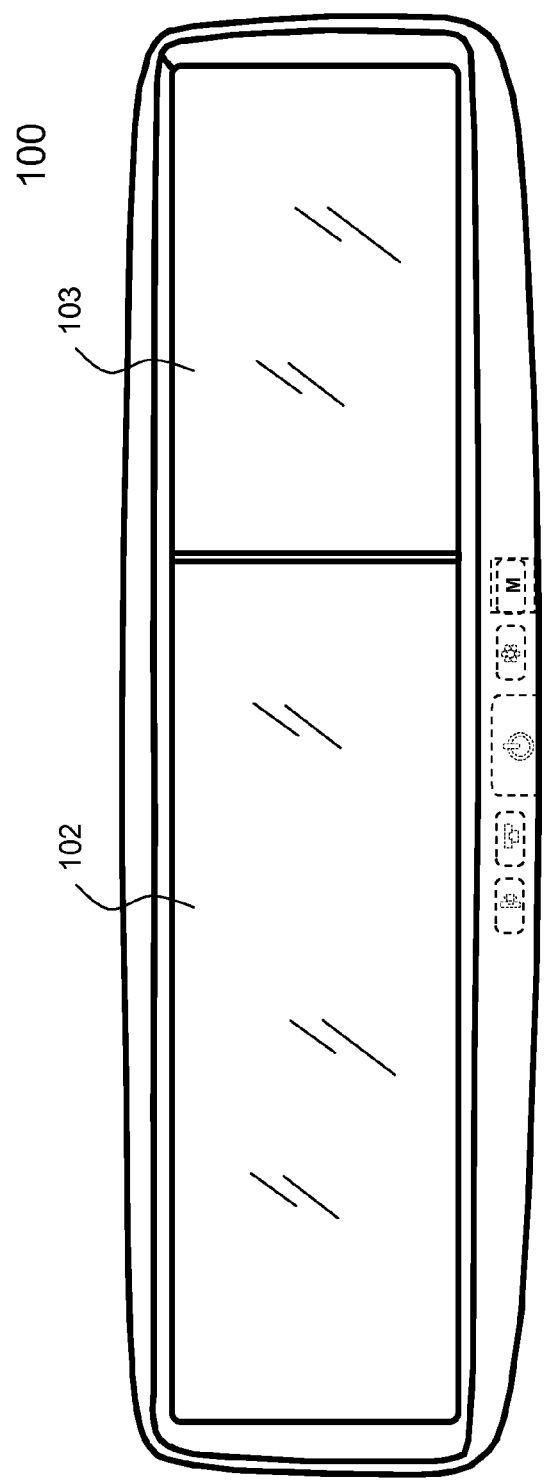
FIG. 1B shows the exemplary interior rear-view mirror of FIG. 1A with a piece of reflector as a cover to cover a compartment for a GPS device.

Referring now to the drawings, in which like numerals refer to like parts throughout the several views. According to one embodiment of the present invention, FIG. 1A shows an exemplary interior rear-view mirror 100 that can be used in a vehicle. The rear-view mirror 100 includes two parts, the first part 102 is a normal reflector commonly used in a vehicle, the second part 104 is a portable GPS device that may be removed from the rear-view mirror 100, when needed.

According to one embodiment, the GPS device 102 is mounted onto the rear-view mirror 100. In other words, there is a mechanism horizontally arranged adjacent to the first part 102. Depending on implementation, the mechanism may include mechanical tracks 106 for the GPS device 104, as shown in FIG. 1C, to slide on or an opening for the GPS device to be resided in. Those skilled in the art may appreciate that there are many ways to mount the GPS device removably into the rear-view mirror 100, the details of which are omitted here to avoid obscuring aspect of the present invention.

According to one embodiment, when the GPS device 102 is removed from the rear-view mirror 100, a reflector may be mounted to cover the exposed opening, thus forming an integrated reflector. In other words, the rear-view mirror 100 has a reflector including two pieces, one of which is removable for the GPS device if needed.

One of the important features, objects and advantages in the present invention is that a GPS device may be removed from the rear-view mirror 100 when the vehicle is left unattended. At the same time, the GPS device may be used with a user while walking. Further, from the economic perspective, the GPS device is much less costly than a similar one mounted on a dashboard of a vehicle. Compared to a rack for a GPS device deposed on top of a dashboard of a vehicle, the arrangement of the GPS in the present invention is not likely to obstruct the view of a driver.

Figure 2:
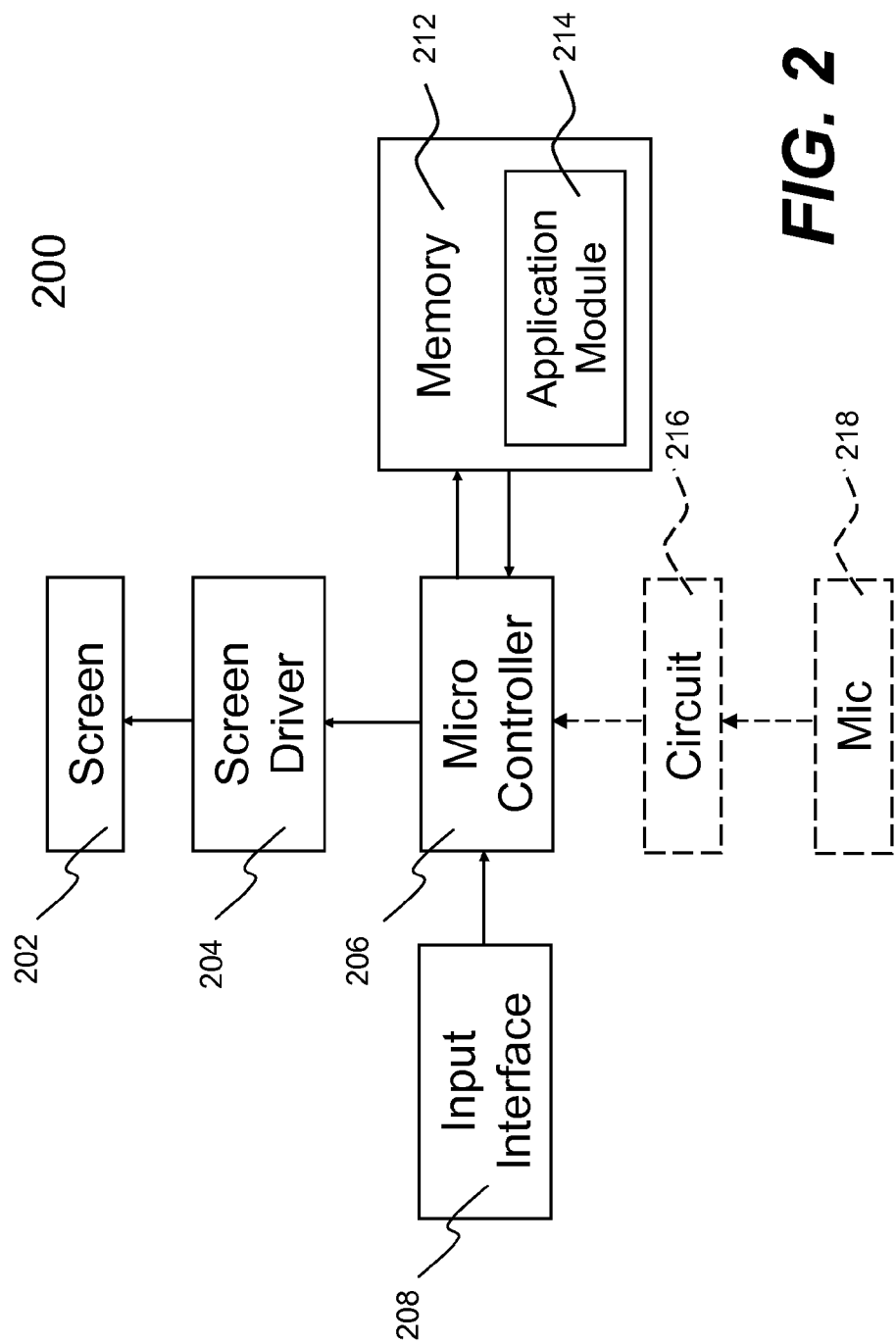
FIG. 2 illustrates an internal functional block diagram of a portable device having GPS functions (e.g., a cellular phone, a navigation system device or a PDA)

FIG. 2 illustrates an internal functional block diagram 200 of a portable device, such as a cellular phone, a navigation system device or a PDA. The screen 202 may be a LCD touch screen. The screen 202 communicates with and is commanded by a screen driver 204 that is controlled by a microcontroller (e.g., a processor) 206. The memory 212 may be loaded with one or more application modules 214 that can be executed by the microcontroller 206 with or without a user input via the user interface 208 to achieve desired tasks. In one embodiment, as will be further described below, an application module 214 is configured to determine when to accept input from a user or announce a directional instruction to alert a driver to follow. In another embodiment, an application module 214 is configured to generate sounds or verbal instructions based on text inputs from a user. In operation, when the microcontroller 206 executes the application modules 214, the screen driver 204 generates control signals to cause the screen 202 to display an application specific user interface accordingly, more of which will be described below.

According to one embodiment, the application module 214 is activated to allow a user to enter texts in accordance with displayed events on the screen 202. For example, the screen 202 shows an arrow of "left turn" or an instruction, the user may enter "hi man, make a left turn now" or something the user feels more personalized or fun. The text may be entered via the input interface 208 (e.g., a touch screen or a joystick). In an actual procedure, the user may be prompted with a set of events, so that the user may enter texts corresponding respectively to the events.

Figure 3:
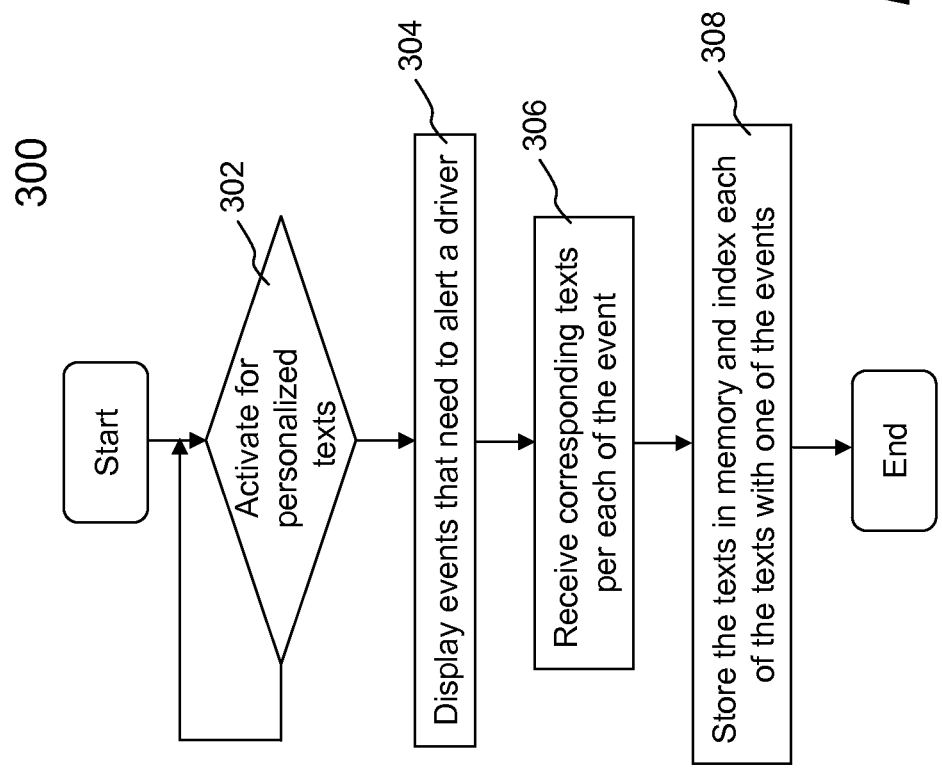
FIG. 3 shows a flowchart of receiving texts and generating verbal instructions when needed.

The applicant module 214 is also configured to convert the texts into voice or verbal instructions via the microcontroller 206. FIG. 3 shows a flowchart 300 of receiving texts and generating verbal instructions when needed. At 302, the function of using personalized instruction is manually activated, otherwise the default instruction or voice in the GPS device will be used. It is assumed that a user does want to use personalized instructions for events that need to alert a driver. For example, when approaching to a junction, a driver or a user of the GPS device shall be alerted as to whether to proceed ahead or make a turn. At 304, the GPS device is caused to display a sequence of such events. For each of the events, the user has an option to enter a text for it (to replace a default instruction or voice) at 306. At 308, the texts entered by the user are stored and indexed with the events. For example, a junction is displayed with a flash arrow of "left turn", the user may enter a sentence of "Watch out, man, make a left turn when it is safe". The sentence is then registered or indexed with the event. In actual use of the GPS device in a vehicle, the sentence is converted to a verbal instruction to be played back when the vehicle is approaching a junction.

According to another embodiment, instead of the user entering the text for an event, the user may speak to a microphone 218 provided in a GPS. The actual voice of the user is processed in circuit 216 and then registered with the event. When the event comes, the user own voice is played back.

Although various technologies have been used to make the voice or verbal instructions from a GPS device more realistic, one of the important features in using user supplied texts or own voices to make the instructions from the GPS device more personal or fun. In one embodiment, a user may provide several verbal instructions or voices for an event, where the several instructions or voices are sequentially or randomly played back when such an event happens.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

I claim:

1. A method for providing a Global Positioning System (GPS) device in a vehicle, the method comprising:

providing a mounting mechanism to hold up a GPS device removable from the mounting mechanism, the mounting mechanism including at least a track for the GPS device to slide on and arranged adjacent to a reflecting surface in the vehicle, the reflecting surface primarily used to assist a driver of the vehicle to view back of the vehicle, wherein the GPS device is an independently operated device and removed from the mounting mechanism to be used with the driver when the driver is away from the vehicle.

2. The method of claim 1, wherein the mounting mechanism includes an opening for the GPS device to be positioned therein.

3. The method of claim 1, wherein the GPS includes a mechanism to record verbal instructions from a user as personalized instructions, each of the personalized instructions corresponding to a situation being displayed.

4. The method of claim 3, wherein one of the personalized instructions is automatically played back by the GPS device when the situation corresponding to a traffic condition happens.

5. The method of claim 1, wherein the reflecting surface provides a designated portion to accommodate the GPS device, the designated portion is exposed when the GPS device is being mounted into the designated portion, and the designated portion is covered with a portion of the reflecting surface when the GPS device is removed from the designated portion.

* * * * *